US012698412B2

(12) United States Patent
Kawai

(10) Patent No.: US 12,698,412 B2
(45) Date of Patent: Aug. 4, 2026

(54) POLYCARBONATE DIOL COMPOSITION AND COATING MATERIAL COMPOSITION COMPRISING SAME

(71) Applicant: ASAHI KASEI KABUSHIKI KAISHA, Tokyo (JP)

(72) Inventor: Yasufumi Kawai, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 701 days.

(21) Appl. No.: 17/769,101

(22) PCT Filed: Oct. 16, 2020

(86) PCT No.: PCT/JP2020/039184
§ 371 (c)(1),
(2) Date: Apr. 14, 2022

(87) PCT Pub. No.: WO2021/095443
PCT Pub. Date: May 20, 2021

(65) Prior Publication Data

US 2023/0023221 A1 Jan. 26, 2023

(30) Foreign Application Priority Data

Nov. 15, 2019 (JP) ................................ 2019-206617

(51) Int. Cl.
*C09D 175/06* (2006.01)
*C08G 18/44* (2006.01)
*C08G 18/79* (2006.01)
*C08L 69/00* (2006.01)
*C09D 7/63* (2018.01)
*C09D 169/00* (2006.01)

(52) U.S. Cl.
CPC ........... *C09D 175/06* (2013.01); *C08G 18/44* (2013.01); *C08G 18/792* (2013.01); *C08L 69/00* (2013.01); *C09D 7/63* (2018.01); *C09D 169/00* (2013.01)

(58) Field of Classification Search
CPC ...... C09D 175/06; C09D 7/63; C09D 169/00; C08G 18/44; C08G 18/792; C08G 18/73; C08L 69/00; D06M 15/572; D06N 3/146
See application file for complete search history.

(56) References Cited

U.S. PATENT DOCUMENTS 6,441,087 B1 8/2002 Zhou et al.
2003/0176622 A1 9/2003 Konishi et al.
2007/0081918 A1 4/2007 Dhara et al.
2010/0261852 A1 10/2010 Masubushi et al.
2015/0291724 A1 10/2015 Kusano et al.
2018/0186920 A1* 7/2018 Kusano ................ C08G 64/305

FOREIGN PATENT DOCUMENTS

| | | | |
|---|---|---|---|
| EP | 0272417 | 11/1987 | |
| EP | 2514779 | 10/2012 | |
| EP | 3733799 | 11/2020 | |
| JP | S63213554 | 9/1988 | |
| JP | 2009511667 | 3/2009 | |
| JP | 2011032378 | 2/2011 | |
| JP | 2012077280 | 4/2012 | |
| JP | 2012077280 A * | 4/2012 | ............. C08G 18/44 |
| JP | 2013181171 | 9/2013 | |
| JP | 2015166466 | 9/2015 | |
| JP | 2017197772 | 11/2017 | |
| JP | 2018012769 | 1/2018 | |
| JP | 2018053122 | 4/2018 | |
| JP | 2018178000 | 11/2018 | |
| JP | 2019137840 | 8/2019 | |
| WO | 2001/090213 | 11/2001 | |
| WO | 2009/063767 | 5/2009 | |
| WO | 2011/027640 | 3/2011 | |
| WO | 2011/074617 | 6/2011 | |
| WO | 2019/131617 | 7/2019 | |

OTHER PUBLICATIONS

English translation of JP-2012077280-A (Year: 2012).*
International Search Report issued with respect to application PCT/JP2020/039184, dated Dec. 15, 2020, with English translation.
International Preliminary report on patentability issued with respect to application PCT/JP2020/039184, dated May 17, 2022, with English translation.
Supplementary European Search Report issued in EP Patent Application No. 20888325.6, Nov. 10, 2022.

* cited by examiner

*Primary Examiner* — Mark Eashoo
*Assistant Examiner* — Cullen L G Davidson
(74) *Attorney, Agent, or Firm* — GREENBLUM & BERNSTEIN, P.L.C.

(57) ABSTRACT

Provided is a polycarbonate diol composition comprising a polycarbonate diol represented by a specific formula and a diol component represented by a specific formula, wherein 90% by mol or more of the total quantity of terminal groups is hydroxy groups, a hydroxy value is 10 to 400 mg-KOH/g, a proportion of the polycarbonate diol is 80% by mass or more and 99.90% by mass or less and a proportion of the diol component is 0.10% by mass or more and 20% by mass or less based on 100% by mass in total of the carbonate diol and the diol component.

11 Claims, No Drawings

POLYCARBONATE DIOL COMPOSITION AND COATING MATERIAL COMPOSITION COMPRISING SAME

TECHNICAL FIELD

The present invention relates to a polycarbonate diol composition and a coating material composition comprising the same.

BACKGROUND ART

For example, use of a polycarbonate diol that can confer excellent flexibility, weather resistance, hydrolysis resistance, oil resistance, and chemical resistance as a base agent for urethane coating material compositions has heretofore been proposed.

In general, polycarbonate diol that is obtained using two or more diols and that is a liquid at ordinary temperature is used as such polycarbonate diol from the viewpoint of handleability and compatibility with solvents. For example, Patent Document 1 discloses a polycarbonate diol obtained using 1,5-pentanediol and 1,6-hexanediol as diol components. For example, Patent Document 2 discloses polycarbonate diol obtained using 1,4-butanediol and 1,6-hexanediol.

LIST OF PRIOR ART DOCUMENTS

Patent Document

Patent Document 1: International Publication No. WO 2001/090213

Patent Document 2: International Publication No. WO 2009/063767

SUMMARY OF INVENTION

Problems to be Solved by Invention

However, even a polycarbonate diol that is a liquid at ordinary temperature may become white turbid or crystallized when stored at a low temperature, and disadvantageously causes turbidity or precipitates during the low-temperature storage of a coating material composition containing such polycarbonate diol. Since polycarbonate diol generally does not have good compatibility with acrylic polyol, unfortunately, the polycarbonate diol cannot be used in combination with acrylic polyol. Furthermore, the polycarbonate diols described in Patent Documents 1 and 2 are still susceptible to improvement in these problems.

Accordingly, an object of the present invention is to provide a polycarbonate diol composition that is excellent in stability during low-temperature storage and compatibility with acrylic polyol.

Means for Solving Problems

The present inventor has made earnest studies to solve the above-described problems, and as a result, it has been found that use of a polycarbonate polyol composition having a specific structure offers excellent stability during low-temperature storage, compatibility with acrylic polyol and adhesion after an endurance test, and thus, the present invention has been accomplished.

Specifically, the present invention is configured as follows.

[1]

A polycarbonate diol composition comprising polycarbonate diol represented by the following formula (A) and a diol component represented by the following formula (B), wherein

- 90% by mol or more of a total quantity of a terminal group is a hydroxy group,
- a hydroxy value is 10 to 400 mg-KOH/g,
- a proportion of the polycarbonate diol is 80% by mass or more and 99.90% by mass or less and a proportion of the diol component is 0.10% by mass or more and 20% by mass or less based on 100% by mass in total of the carbonate diol and the diol component:

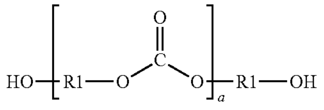

(A)

wherein R1 is a divalent linear, branched or cyclic aliphatic hydrocarbon group having 2 or more and 15 or less carbon atoms, or a divalent aromatic hydrocarbon group, and a plurality of R1 moieties are the same as or different from each other; and a is a number of 1 or larger and 50 or smaller.

HO—R2—OH (B)

wherein R2 is a divalent linear or branched aliphatic hydrocarbon group having 2 or more and 5 or less carbon atoms.

[2]

The polycarbonate diol composition according to [1], wherein an area percentage (%) of a number-average molecular weight of 500 or lower in molecular weight calculation results obtained by calculation by the gel permeation chromatography (GPC) measurement of the polycarbonate diol composition is 1% or more and 30% or less.

[3]

The polycarbonate diol composition according to [1] or [2], wherein a proportion of the diol component represented by the formula (B) in a dihydroxy compound obtained by the hydrolysis of the polycarbonate diol composition is 5% by mol or more and 100% by mol or less.

[4]

The polycarbonate diol composition according to any of [1] to [3], wherein appearance of the polycarbonate diol composition stored at 5° C. for 1 week is transparent and liquid.

[5]

A coating material composition comprising the polycarbonate diol composition according to any of [1] to [4].

[6]

A coating film obtained from the coating material composition according to [5].

[7]

A polyurethane obtained using the polycarbonate diol composition according to any of [1] to [4].

[8]

An aqueous polyurethane obtained using the polycarbonate diol composition according to any of [1] to [4].

[9]

An artificial leather obtained using the polyurethane according to [7] or the aqueous polyurethane according to [8].

[10]

A synthetic leather obtained using the polyurethane according to [7] or the aqueous polyurethane according to [8].

[11]

A coating material obtained using the polyurethane according to [7] or the aqueous polyurethane according to [8].

[12]

A coating agent obtained using the polyurethane according to [7] or the aqueous polyurethane according to [8].

[13]

A polycarbonate diol composition comprising a polycarbonate diol represented by the following formula (AA) and a diol component represented by the following formula (BB), wherein

- 90% by mol or more of a total quantity of a terminal group is a hydroxy group,
- a hydroxy value is 10 to 400 mg-KOH/g,
- a proportion of the polycarbonate diol is 80% by mass or more and 99.90% by mass or less and a proportion of the diol component is 0.10% by mass or more and 20% by mass or less based on 100% by mass in total of the carbonate diol and the diol component:

(AA)

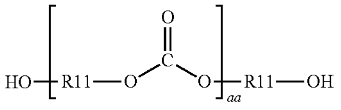

wherein R11 is a divalent linear, branched or cyclic aliphatic hydrocarbon group optionally containing a heteroatom, or a divalent aromatic hydrocarbon group optionally containing a heteroatom, and a plurality of R11 moieties are the same as or different from each other; and aa is a number of 1 or larger and 50 or smaller,

HO—R22-OH (BB)

wherein R22 is a divalent linear or branched aliphatic hydrocarbon group having 2 or more and 5 or less carbon atoms and optionally containing a heteroatom.

[14]

The polycarbonate diol composition according to [13], wherein an area percentage (%) of a number-average molecular weight of 500 or lower in molecular weight calculation results obtained by calculation by the gel permeation chromatography (GPC) measurement of the polycarbonate diol composition is 1% or more and 30% or less.

[15]

The polycarbonate diol composition according to or [14], wherein a proportion of the diol component represented by the formula (BB) in a dihydroxy compound obtained by the hydrolysis of the polycarbonate diol composition is 5% by mol or more and 100% by mol or less.

[16]

The polycarbonate diol composition according to any of to [15], wherein appearance of the polycarbonate diol composition stored at 5° C. for 1 week is transparent and liquid.

[17]

A coating material composition comprising the polycarbonate diol composition according to any of to.

[18]

A coating film obtained from the coating material composition according to [17].

[19]

A polyurethane obtained using the polycarbonate diol composition according to any of [13] to [16].

[20]

An aqueous polyurethane obtained using the polycarbonate diol composition according to any of [13] to [16].

[21]

An artificial leather obtained using the polyurethane according to [19] or aqueous polyurethane according to [20].

[22]

A synthetic leather obtained using the polyurethane according to [19] or the aqueous polyurethane according to [20].

[23]

A coating material obtained using the polyurethane according to [19] or the aqueous polyurethane according to [20].

[24]

A coating agent obtained using the polyurethane according to [19] or the aqueous polyurethane according to [20].

Advantages of Invention

The present invention can provide a polycarbonate diol composition excellent in stability during low-temperature storage, compatibility with acrylic polyol and adhesion after an endurance test.

Mode for Carrying Out Invention

Hereinafter, the mode for carrying out the present invention (hereinafter, referred to as the "present embodiment") will be described in detail. The present invention is not limited by the description below and can be carried out with various modification or changes made therein without departing from the spirit of the present invention.

[Polycarbonate Diol Composition]

The polycarbonate diol composition of the present embodiment includes a polycarbonate diol composition of the first embodiment and a polycarbonate diol composition of the second embodiment.

[First Polycarbonate Diol Composition]

The polycarbonate diol composition of the first embodiment comprises a polycarbonate diol. The polycarbonate diol composition of the first embodiment comprises a polycarbonate diol represented by the following formula (A) and a diol component represented by the following formula (B), wherein 90% by mol or more of the total quantity of terminal groups is hydroxy groups, a hydroxy value is 10 to 400 mg-KOH/g, a proportion of the polycarbonate diol is 80% by mass or more and 99.90% by mass or less and a proportion of the diol component is 0.10% by mass or more and 20% by mass or less based on 100% by mass in total of the carbonate diol and the diol component:

(A)

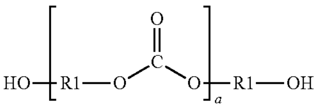

wherein R1 is a divalent linear, branched or cyclic aliphatic hydrocarbon group having 2 or more and 15 or less carbon atoms, or a divalent aromatic hydrocarbon group, and a plurality of R1 moieties are the same as or different from each other; and a is a number of 1 or larger and 50 or smaller.

HO—R2-OH (B)

wherein R2 is a divalent linear or branched aliphatic hydrocarbon group having 2 or more and 5 or less carbon atoms.

As for the proportions of the carbonate diol (A) and the diol component (B) in the polycarbonate diol composition of the first embodiment, based on 100% by mass in total of the carbonate diol and the diol component, the proportion of the polycarbonate diol is 80% by mass or more and 99.90% by mass or less and the proportion of the diol component is 0.10% by mass or more and 20% by mass or less; preferably, the proportion of the polycarbonate diol is 90% by mass or more and 99.90% by mass or less, and the proportion of the diol component is 0.10% by mass or more and 10% by mass or less; more preferably, the proportion of the polycarbonate diol is 93% by mass or more and 99.90% by mass or less, and the proportion of the diol component is 0.10% by mass or more and 7% by mass or less; further preferably, the proportion of the polycarbonate diol is 95% by mass or more and 99.90% by mass or less, and the proportion of the diol component is 0.10% by mass or more and 5% by mass or less; still further preferably, the proportion of the polycarbonate diol is 97% by mass or more and 99.85% by mass or less, and the proportion of the diol component is 0.15% by mass or more and 3% by mass or less; and particularly preferably, the proportion of the polycarbonate diol is 97% by mass or more and 99.8% by mass or less, and the proportion of the diol component is 0.2% by mass or more and 3% by mass or less.

When the proportions of the carbonate diol (A) and the diol component (B) fall within the ranges described above, a coating material composition comprising the polycarbonate diol composition tends to be excellent in leveling properties and adhesion.

The proportions of the carbonate diol (A) and the diol component (B) in the polycarbonate diol composition can be calculated from an area percentage (%) by gel permeation chromatography (hereinafter, also referred to as "GPC") measurement. The GPC measurement can be performed by use of a method described in Examples mentioned later.

The proportion of the diol component represented by the formula (B) in dihydroxy compounds obtained by the hydrolysis of the polycarbonate diol composition of the first embodiment is preferably 5% by mol or more and 100% by mol or less, more preferably 20% by mol or more and 90% by mol or less, further preferably 30% by mol or more and 70% by mol or less, still further preferably 35% by mol or more and 65% by mol or less, particularly preferably 45% by mol or more and 55% by mol or less. When the proportion of the diol component represented by the formula (B) in dihydroxy compounds obtained by the hydrolysis of the polycarbonate diol composition falls within the range described above, the polycarbonate diol composition of the first embodiment tends to be excellent in transparent and liquid nature when stored at 5° C., and compatibility with acrylic polyol. Examples of the method for obtaining the polycarbonate diol composition having the proportion of the diol component represented by the formula (B) that falls within the range described above by hydrolysis include, but are not particularly limited to, a method of producing the polycarbonate diol composition while adjusting the proportions of the diol component represented by the formula (B) and other diol components, and a method of adding the diol component represented by the formula (B) and other diol components to the obtained polycarbonate diol composition. The hydrolysis of the polycarbonate diol composition can be carried out by use of a method described in Examples mentioned later.

[Polycarbonate Diol Composition of Second Embodiment]

The polycarbonate diol composition of the second embodiment will be described below. The polycarbonate diol composition of the second embodiment is a generalized form of the polycarbonate diol of the first embodiment mentioned above.

Specifically, the polycarbonate diol composition of the second embodiment comprises a polycarbonate diol represented by the following formula (AA) and a diol component represented by the following formula (BB), wherein

- 90% by mol or more of the total quantity of terminal groups is hydroxy groups,
- a hydroxy value is 10 to 400 mg-KOH/g,
- a proportion of the polycarbonate diol is 80% by mass or more and 99.90% by mass or less and a proportion of the diol component is 0.10% by mass or more and 20% by mass or less based on 100% by mass in total of the carbonate diol and the diol component:

(AA)

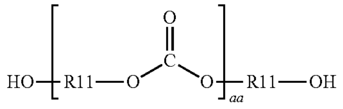

wherein R11 is a divalent linear, branched or cyclic aliphatic hydrocarbon group optionally containing a heteroatom, or a divalent aromatic hydrocarbon group optionally containing a heteroatom, and a plurality of R11 moieties are the same as or different from each other; and aa is a number of 1 or larger and 50 or smaller,

HO—R22-OH (BB)

wherein R22 is a divalent linear or branched aliphatic hydrocarbon group having 2 or more and 5 or less carbon atoms and optionally containing a heteroatom.

As for the proportions of the carbonate diol (AA) and the diol component (BB) in the polycarbonate diol composition of the second embodiment, based on 100% by mass in total of the carbonate diol and the diol component, the proportion of the polycarbonate diol is 80% by mass or more and 99.90% by mass or less and the proportion of the diol component is 0.10% by mass or more and 20% by mass or less; preferably, the proportion of the polycarbonate diol is 90% by mass or more and 99.90% by mass or less, and the proportion of the diol component is 0.10% by mass or more and 10% by mass or less; more preferably, the proportion of the polycarbonate diol is 93% by mass or more and 99.90% by mass or less, and the proportion of the diol component is 0.10% by mass or more and 7% by mass or less; further preferably, the proportion of the polycarbonate diol is 95% by mass or more and 99.90% by mass or less, and the proportion of the diol component is 0.10% by mass or more and 5% by mass or less; still further preferably, the proportion of the polycarbonate diol is 97% by mass or more and 99.85% by mass or less, and the proportion of the diol component is 0.15% by mass or more and 3% by mass or less; and particularly preferably, the proportion of the polycarbonate diol is 97% by mass or more and 99.8% by mass or less, and the proportion of the diol component is 0.2% by mass or more and 3% by mass or less.

When the proportions of the carbonate diol (AA) and the diol component (BB) fall within the ranges described above, a coating material composition comprising the polycarbonate diol composition tends to be excellent in leveling properties and adhesion.

The proportions of the carbonate diol (AA) and the diol component (BB) in the polycarbonate diol composition can be calculated from an area percentage (%) by gel permeation chromatography (hereinafter, also referred to as "GPC") measurement. The GPC measurement can be performed by use of a method described in Examples mentioned later.

The proportion of the diol component represented by the formula (BB) in dihydroxy compounds obtained by the hydrolysis of the polycarbonate diol composition of the second embodiment is preferably 5% by mol or more and 100% by mol or less, more preferably 20% by mol or more and 90% by mol or less, further preferably 30% by mol or more and 70% by mol or less, still further preferably 35% by mol or more and 65% by mol or less, particularly preferably 45% by mol or more and 55% by mol or less. When the proportion of the diol component represented by the formula (BB) in dihydroxy compounds obtained by the hydrolysis of the polycarbonate diol composition falls within the range described above, the polycarbonate diol composition of the second embodiment tends to be excellent in transparent and liquid nature when stored at 5° C., and compatibility with acrylic polyol. Examples of the method for obtaining the polycarbonate diol composition having the proportion of the diol component represented by the formula (BB) that falls within the range described above by hydrolysis include, but are not particularly limited to, a method of producing the polycarbonate diol composition while adjusting the proportions of the diol component represented by the formula (BB) and other diol components, and a method of adding the diol component represented by the formula (BB) and other diol components to the obtained polycarbonate diol composition. The hydrolysis of the polycarbonate diol composition can be carried out by use of a method described in Examples mentioned later.

The hydroxy value of the polycarbonate diol composition of the present embodiment is 10 to 400 mg-KOH/g, preferably 20 to 300 mg-KOH/g, more preferably 30 to 250 mg-KOH/g. When the hydroxy value is equal to or larger than the lower limit value described above, thermoplastic urethane obtained from the polycarbonate diol composition tends to have better flexibility and low-temperature characteristics. On the other hand, when the hydroxy value is equal to or smaller than the upper limit value described above, thermoplastic urethane obtained from the polycarbonate diol composition tends to have better molding processability. The hydroxy value can be calculated by use of a method described in Examples mentioned later.

In the polycarbonate diol composition of the present embodiment, 90% by mol or more of the total quantity of terminal groups is hydroxy groups. Preferably, 90% by mol or more and 100% by mol or less of the total quantity of terminal groups are hydroxy groups. More preferably, 95% by mol or more and 100% by mol or less of the total quantity of terminal groups are hydroxy groups.

When the proportion of the hydroxy groups in the total quantity of terminal groups in the polycarbonate diol composition of the present embodiment falls within the range described above, the drying properties, adhesion, and chemical resistance of a coating film comprising the polycarbonate diol composition tend to be improved.

Examples of the method for obtaining the polycarbonate diol composition having the proportion of the hydroxy groups in the total quantity of terminal groups that falls within the range described above include, but are not particularly limited to, a method using starting materials having high purity in the production of the polycarbonate diol composition, and a method of suppressing the dehydration of terminal hydroxy groups by setting a reaction temperature to 200° C. or lower in the production of the polycarbonate diol composition.

In the polycarbonate diol composition of the present embodiment, examples of terminal groups other than the hydroxy groups include alkyl groups, a vinyl group, and aryl groups.

In the present embodiment, the proportion of the hydroxy groups in the total quantity of terminal groups can be measured by use of a method described in Examples mentioned later.

The area percentage (%) of a number-average molecular weight of 500 or lower in molecular weight calculation results obtained by calculation by the GPC measurement of the polycarbonate diol composition of the present embodiment is preferably 1% or more and 30% or less, more preferably 1% or more and 25% or less, further preferably 1% or more and 20% or less, particularly preferably 1.0% or more and 15% or less. When the area percentage (%) of a number-average molecular weight of 500 or lower falls within the range described above, a coating material composition comprising the polycarbonate diol composition of the present embodiment tends to be excellent in stability during storage at 5° C. In addition, the polycarbonate diol composition of the present embodiment tends to be excellent in compatibility with polyol such as polyester polyol, acrylic polyol, polyether polyol, polyolefin polyol, or fluorine polyol described in Japanese Patent Laid-Open No. 2018-012769, or an additive such as a leveling agent. Examples of the method for obtaining the polycarbonate diol composition having the area percentage (%) of a number-average molecular weight of 500 or lower that falls within the range described above include, but are not particularly limited to, a method of adding polyol or diol having a number-average molecular weight of 500 or lower. The area percentage (%) based on the GPC measurement of the polycarbonate diol composition can be calculated by a method described in Examples mentioned later.

The appearance of the polycarbonate diol composition of the present embodiment stored at 5° C. for 1 week is preferably transparent and liquid. A coating material composition comprising such a polycarbonate diol composition can prevent turbidity or precipitates during low-temperature storage and tends to be much superior in stability during low-temperature storage.

Examples of the method for obtaining the polycarbonate diol composition of which appearance is transparent and liquid after storage at 5° C. for 1 week include, but are not particularly limited to, a method of producing the polycarbonate diol composition using two or more diols, and a method of producing the polycarbonate diol composition using one or more diols that are liquid at 23° C.

(R1)

In the formula (A), R1 is a divalent aliphatic or alicyclic hydrocarbon group having 2 to 15 carbon atoms. A plurality of R1 moieties are the same as or different from each other.

The divalent linear aliphatic hydrocarbon group represented by R1 has 2 or more and 15 or less, preferably 3 or more and 12 or less, more preferably 3 or more and 10 or less carbon atoms.

Specific examples of the divalent linear aliphatic hydrocarbon group having 2 or more and 15 or less carbon atoms represented by R1 include, but are not particularly limited to, an ethylene group, a propylene group, a butylene group, a pentylene group, a hexylene group, a heptylene group, an octylene group, a nonylene group, and a decylene group. Among others, a propylene group, a butylene group, a pentylene group, a hexylene group, a nonylene group, or a decylene group is preferred from the viewpoint of versatility.

The divalent branched aliphatic hydrocarbon group represented by R1 has 3 or more and 15 or less, preferably 3 or more and 12 or less, more preferably 3 or more and 10 or less carbon atoms.

Specific examples of the divalent branched aliphatic hydrocarbon group represented by R1 include, but are not particularly limited to, an isopropylene group, an isobutylene group, a tert-butylene group, an isopentylene group, a 2,2-dimethyltrimethylene group, an isohexylene group, an isoheptylene group, and an isooctylene group. Among others, an isopropylene group, an isobutylene group, an isopentylene group, a 2,2-dimethyltrimethylene group or an isohexylene group is preferred from the viewpoint of versatility.

The divalent cyclic aliphatic hydrocarbon group represented by R1 has 3 or more and 15 or less, preferably 6 or more and 15 or less, more preferably 6 or more and 10 or less carbon atoms.

Specific examples of the divalent cyclic aliphatic hydrocarbon group represented by R1 include, but are not particularly limited to, a cyclobutylene group, a cyclopentylene group, a cyclohexylene group, and a cycloheptylene group.

The divalent aromatic hydrocarbon group represented by R1 has 6 or more and 15 or less, preferably 6 or more and 12 or less, more preferably 6 or more and 10 or less carbon atoms.

Specific examples of the divalent aromatic hydrocarbon group represented by R1 include, but are not particularly limited to, a phenylene group and a naphthylene group.

Among others, R1 is preferably a divalent linear, branched or cyclic aliphatic hydrocarbon group having 2 or more and 15 or less carbon atoms (i.e., an alkylene group), more preferably a divalent linear aliphatic hydrocarbon group having 3 or more and 12 or less carbon atoms, or a divalent branched aliphatic hydrocarbon group having 3 or more and 15 or less carbon atoms, further preferably a divalent linear aliphatic hydrocarbon group having 3 or more and 10 or less carbon atoms.

(R11)

In the formula (AA), R11 is divalent aliphatic or alicyclic hydrocarbon group optionally containing a heteroatom. A plurality of R11 moieties are the same as or different from each other.

For the divalent linear aliphatic hydrocarbon group optionally containing a heteroatom represented by R11, the molecular weight of R11 is preferably 20 or higher and 3000 or lower, more preferably 30 or higher and 2500 or lower, further preferably 40 or higher and 2200 or lower.

When R11 is, for example, an ethylene group ($—CH_2—CH_2—$), the molecular weight of R11 is (12+1× 2)+ (12+1×2)=28.

Specific examples of the divalent linear aliphatic hydrocarbon group optionally containing a heteroatom represented by R11 include, but are not particularly limited to, an ethylene group, a propylene group, a butylene group, a pentylene group, a hexylene group, a heptylene group, an octylene group, a nonylene group, and a decylene group, an oxyethylene group, and an oxytetramethylene group. Among others, a propylene group, a butylene group, a pentylene group, a hexylene group, a nonylene group, a decylene group, an oxyethylene group, an oxy-1-methylethylene group, an oxytetramethylene group, a polyoxyethylene group, a polyoxy-1-methylethylene group, or a polyoxytetramethylene group is preferred from the viewpoint of versatility.

For the divalent branched aliphatic hydrocarbon group optionally containing a heteroatom represented by R11, the molecular weight of the R11 substituent is preferably 20 or higher and 3000 or lower, more preferably 30 or higher and 2500 or lower, further preferably 40 or higher and 2200 or lower.

Specific examples of the divalent branched aliphatic hydrocarbon group optionally containing a heteroatom represented by R11 include, but are not particularly limited to, an isopropylene group, an isobutylene group, a tert-butylene group, an isopentylene group, a 2,2-dimethyltrimethylene group, an isohexylene group, an isoheptylene group, an isooctylene group, an oxy-1-methylethylene group, and an oxy-2,2-dimethyltrimethylene group. Among others, an isopropylene group, an isobutylene group, an isopentylene group, a 2,2-dimethyltrimethylene group, an isohexylene group, an oxy-1-methylethylene group, or a polyoxy-1-methylethylene group is preferred from the viewpoint of versatility.

For the divalent cyclic aliphatic hydrocarbon group optionally containing a heteroatom represented by R11, the molecular weight of the R11 substituent is preferably 20 or higher and 3000 or lower, more preferably 30 or higher and 2500 or lower, further preferably 40 or higher and 2200 or lower.

Specific examples of the divalent cyclic aliphatic hydrocarbon group optionally containing a heteroatom represented by R11 include, but are not particularly limited to, a cyclobutylene group, a cyclopentylene group, a cyclohexylene group, and a cycloheptylene group.

For the divalent aromatic hydrocarbon group optionally containing a heteroatom represented by R11, the molecular weight of the R11 substituent is preferably 20 or higher and 3000 or lower, more preferably 30 or higher and 2500 or lower, further preferably 40 or higher and 2200 or lower.

Specific examples of the divalent aromatic hydrocarbon group optionally containing a heteroatom represented by R11 include, but are not particularly limited to, a phenylene group and a naphthylene group.

Among others, R11 is preferably a divalent linear, branched or cyclic aliphatic hydrocarbon group optionally containing a heteroatom with a molecular weight of the R11 substituent of 20 or higher and 3000 or lower, more preferably a divalent linear aliphatic hydrocarbon group optionally containing a heteroatom with a molecular weight of the R11 substituent of 30 or higher and 2500 or lower, or a divalent branched aliphatic hydrocarbon group optionally containing a heteroatom with a molecular weight of the R11 substituent of 30 or higher and 2500 or lower, further preferably a divalent linear aliphatic hydrocarbon group optionally containing a heteroatom with a molecular weight of the R11 substituent of 40 or higher and 2200 or lower.

(R2)

In the formula (B), R2 is a divalent linear or branched aliphatic hydrocarbon group having 2 or more and 5 or less carbon atoms.

Specific examples of the divalent linear hydrocarbon group having 2 or more and 5 or less carbon atoms represented by R2 include, but are not particularly limited to, an ethylene group, a propylene group, a butylene group, and a pentylene group. Among others, a propylene group, a butylene group, and a pentylene group is preferred from the viewpoint of versatility.

Specific examples of the divalent branched hydrocarbon group having 2 or more and 5 or less carbon atoms represented by R2 include, but are not particularly limited to, an isopropylene group, an isobutylene group, an isopentylene group, and a 2,2-dimethyltrimethylene group.

In the polycarbonate diol composition of the present embodiment, the method for controlling the proportions of the polycarbonate diol (A) and the diol component (B) may be, for example, a method of allowing the diol component (B) to remain in the process of producing the polycarbonate diol (A), or may be a method of adding the diol component (B) to the polycarbonate diol (A).

The diol component (B) used in the present embodiment is not particularly limited as long as the diol has 2 or more and 5 or less carbon atoms. Specific examples thereof include ethylene glycol, 1,3-propanediol, 1,4-butanediol, 1,5-pentanediol, neopentyl glycol, and 2-methyl-1,3-propanediol. Among others, ethylene glycol, 1,3-propanediol, 1,4-butanediol, 1,5-pentanediol, or 2-methyl-1,3-propanediol is preferred, and ethylene glycol, 1,3-propanediol, 1,4-butanediol, or 1,5-pentanediol is particularly preferred, from the viewpoint of a liquid state at 23° C. and versatility.

(R22)

In the formula (BB), R22 is a divalent linear or branched aliphatic hydrocarbon group having 2 or more and 5 or less carbon atoms and optionally containing a heteroatom.

Specific examples of the divalent linear hydrocarbon group having 2 or more and 5 or less carbon atoms and optionally containing a heteroatom represented by R22 include, but are not particularly limited to, an ethylene group, a propylene group, a butylene group, a pentylene group, and an oxyethylene group. Among others, a propylene group, a butylene group, a pentylene group, and an oxyethylene group is preferred from the viewpoint of versatility.

Specific examples of the divalent branched hydrocarbon group having 2 or more and 5 or less carbon atoms and optionally containing a heteroatom represented by R22 include, but are not particularly limited to, an isopropylene group, an isobutylene group, an isopentylene group, a 2,2-dimethyltrimethylene group, and an oxy-1-methylethylene group.

In the polycarbonate diol composition of the present embodiment, the method for controlling the proportions of the polycarbonate diol (AA) and the diol component (BB) may be, for example, a method of allowing the diol component (BB) to remain in the process of producing the polycarbonate diol (AA), or may be a method of adding the diol component (BB) to the polycarbonate diol (AA).

The diol component (BB) used in the present embodiment is not particularly limited as long as the diol has 2 or more and 5 or less carbon atoms and optionally contains a heteroatom. Specific examples thereof include ethylene glycol, 1,3-propanediol, 1,4-butanediol, 1,5-pentanediol, neopentyl glycol, 2-methyl-1,3-propanediol, and diethylene glycol. Among others, ethylene glycol, 1,3-propanediol, 1,4-butanediol, 1,5-pentanediol, 2-methyl-1,3-propanediol, or diethylene glycol is preferred, and ethylene glycol, 1,3-propanediol, 1,4-butanediol, or 1,5-pentanediol is particularly preferred, from the viewpoint of a liquid state at 23° C. and versatility.

The method for controlling the hydroxy value of the polycarbonate diol composition preferably involves, for example, selecting the starting material polycarbonate diol (A) or polycarbonate diol (AA) as one having an appropriate hydroxy value.

[Method for Producing Polycarbonate Diol (A)]

A method for producing the polycarbonate diol (A) used in the first embodiment is not particularly limited, and a method known in the art may be adopted. The polycarbonate diol (A) can be obtained, for example, through the reaction of a carbonate compound with a diol compound in the presence of a transesterification catalyst.

(Carbonate Compound)

Examples of the carbonate compound for use in the production of the polycarbonate diol (A) used in the first embodiment include, but are not limited to, alkylene carbonate, dialkyl carbonate, and diaryl carbonate.

Examples of the alkylene carbonate include, but are not particularly limited to, ethylene carbonate, trimethylene carbonate, 1,2-propylene carbonate, 1,2-butylene carbonate, 1,3-butylene carbonate, and 1,2-pentylene carbonate.

Examples of the dialkyl carbonate include, but are not particularly limited to, dimethyl carbonate, diethyl carbonate, dipropyl carbonate, and dibutyl carbonate.

Examples of the diaryl carbonate include, but are not particularly limited to, diphenyl carbonate.

Among others, the carbonate compound for use in the production of the polycarbonate diol is preferably alkylene carbonate, more preferably dimethyl carbonate and ethylene carbonate.

(Diol Compound)

Examples of the diol compound for use in the production of the polycarbonate diol (A) include, but are not limited to, linear diol, branched diol, cyclic diol, and diol having an aromatic ring.

Examples of the linear diol include, but are not particularly limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, and 1,12-dodecanediol.

Examples of the branched diol include, but are not particularly limited to, 2-methyl-1,8-octanediol, neopentyl glycol, 2-ethyl-1,6-hexanediol, 2-methyl-1,3-propanediol, 3-methyl-1,5-pentanediol, 2,4-dimethyl-1,5-pentanediol, and 2,4-diethyl-1,5-pentanediol.

Examples of the cyclic diol include, but are not particularly limited to, 1,3-cyclohexanediol, 1,4-cyclohexanediol, 1,4-cyclohexanedimethanol, and 2-bis(4-hydroxycyclohexyl)-propane.

[Method for Producing Polycarbonate Diol (AA)]

A method for producing the polycarbonate diol (AA) used in the second embodiment is not particularly limited, and a method known in the art may be adopted. The polycarbonate diol (AA) can be obtained, for example, through the reaction of a carbonate compound with a diol compound in the presence of a transesterification catalyst.

(Carbonate Compound)

Examples of the carbonate compound for use in the production of the polycarbonate diol (AA) used in the second embodiment include, but are not limited to, alkylene carbonate, dialkyl carbonate, and diaryl carbonate.

Examples of the alkylene carbonate include, but are not particularly limited to, ethylene carbonate, trimethylene carbonate, 1,2-propylene carbonate, 1,2-butylene carbonate, 1,3-butylene carbonate, and 1,2-pentylene carbonate.

Examples of the dialkyl carbonate include, but are not particularly limited to, dimethyl carbonate, diethyl carbonate, dipropyl carbonate, and dibutyl carbonate.

Examples of the diaryl carbonate include, but are not particularly limited to, diphenyl carbonate.

Among others, the carbonate compound for use in the production of the polycarbonate diol is preferably alkylene carbonate, more preferably dimethyl carbonate or ethylene carbonate.

(Diol Compound)

Examples of the diol compound for use in the production of the polycarbonate diol (AA) include, but are not limited to, linear diol, branched diol, cyclic diol, and diol having an aromatic ring.

Examples of the linear diol include, but are not particularly limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, diethylene glycol, triethylene glycol, polyethylene glycol, and polytetraethylene glycol.

Examples of the branched diol include, but are not particularly limited to, 2-methyl-1,8-octanediol, neopentyl glycol, 2-ethyl-1,6-hexanediol, 2-methyl-1,3-propanediol, 3-methyl-1,5-pentanediol, 2,4-dimethyl-1,5-pentanediol, 2,4-diethyl-1,5-pentanediol, and polypropylene glycol.

Examples of the cyclic diol include, but are not particularly limited to, 1,3-cyclohexanediol, 1,4-cyclohexanediol, 1,4-cyclohexanedimethanol, 2-bis(4-hydroxycyclohexyl)-propane, and isosorbide.

[Production Conditions for Polycarbonate Diol (A) or Polycarbonate Diol (AA)]

For the production of the polycarbonate diol (A) or the polycarbonate diol (AA) used in the present embodiment, a transesterification reaction catalyst can be used.

Examples of the transesterification reaction catalyst include, but are not particularly limited to, alkali metals and alkaline earth metals, and alcoholates thereof, hydrides thereof, oxides thereof, amides thereof, hydroxides thereof and salts thereof.

Examples of the salts of the alkali metal and the alkaline earth metal include, but are not particularly limited to, carbonate, nitrogen-containing borate, and basic salts with organic acids.

Examples of the alkali metal include, but are not particularly limited to, lithium, sodium, and potassium.

Examples of the alkaline earth metal include, but are not particularly limited to, magnesium, calcium, strontium, and barium.

Examples of the transesterification catalyst using a metal other than alkali metals and alkaline earth metals include, but are not particularly limited to, metals other than alkali metals and alkaline earth metals, and salts thereof, alcoholates thereof, and organic compounds containing the metals.

Specific examples of the metal other than alkali metals and alkaline earth metals include, but are not particularly limited to, aluminum, titanium, vanadium, chromium, manganese, iron, cobalt, nickel, copper, zinc, gallium, germanium, zirconium, niobium, molybdenum, ruthenium, rhodium, palladium, silver, indium, tin, antimony, tungsten, rhenium, osmium, iridium, platinum, gold, thallium, lead, bismuth, and ytterbium.

One of these transesterification catalysts can be used alone, or two or more thereof can be used in combination.

Among others, the transesterification reaction catalyst is preferably at least one metal selected from the group consisting of sodium, potassium, magnesium, potassium, titanium, zirconium, tin, lead and ytterbium, or a salt thereof, an alkoxide thereof, or an organic compound containing the metal, because transesterification reaction to obtain the polycarbonate diol is more favorably performed, and use of the resulting polycarbonate diol has less influence on urethane reaction.

The transesterification reaction catalyst is more preferably at least one metal selected from the group consisting of magnesium, titanium, ytterbium, tin and zirconium.

Specific examples of the preferred transesterification catalyst include organic compounds of lead and organic compounds of titanium.

Examples of the organic compound of lead include, but are not particularly limited to, lead acetate trihydrate, tetraphenyl lead, and lead stearate.

Examples of the organic compound of titanium include, but are not particularly limited to, titanium tetra-n-butoxide, titanium tetra-n-propoxide, and titanium tetraisopropoxide.

The amount of the transesterification reaction catalyst used is preferably 0.00001% by mass or more and 0.1% by mass or less, more preferably 0.0001% by mass or more and 0.05% by mass or less, based on the total mass of the starting materials.

The transesterification catalyst used in transesterification reaction is not consumed by the transesterification reaction when heat treatment is performed subsequently to the production of the polycarbonate diol. Therefore, its amount can be calculated on the basis of the amount of the transesterification reaction catalyst used. In the case of using, for example, commercially available polycarbonate diol, the amount of a metal of the transesterification reaction catalyst contained in the polycarbonate diol is determined by ICP (inductively coupled plasma) measurement.

The polycarbonate diol (A) used in the present embodiment may be produced through the transesterification reaction of polycarbonate diol and a diol compound or two or more types of polycarbonate diols.

When the starting material polycarbonate diol contains a catalyst poison for the transesterification reaction catalyst, etc. used in the production thereof, transesterification reaction usually tends to be less likely to progress. Hence, for the production of the polycarbonate diol, the transesterification reaction catalyst described above can be newly added in a necessary amount.

On the other hand, when the starting material polycarbonate diol contains no catalyst poison for the transesterification reaction catalyst, the transesterification reaction according to the present embodiment usually tends to be more likely to progress. However, in the case of, for example, further lowering a reaction temperature or further shortening a reaction time in the process of producing the polycarbonate diol, the transesterification reaction catalyst can also be newly added in a necessary amount. In this case, the same transesterification reaction catalyst as that used in the production of the starting material polycarbonate diol can be adopted.

Specifically, the transesterification reaction can be carried out by mixing starting materials, and stirring the mixture under heating.

The temperature of the transesterification reaction is not particularly limited and is preferably 120° C. or higher and 250° C. or lower, more preferably 140° C. or higher and 200° C. or lower.

When the reaction temperature is equal to or higher than the lower limit value described above, the transesterification reaction can be performed in a shorter time, leading to excellent cost efficiency. When the reaction temperature is equal to or lower than the upper limit value described above, the resulting polycarbonate diol can be more effectively prevented from being stained.

The reaction pressure of the transesterification reaction is not particularly limited and is preferably atmospheric pressure or higher and 1 MPa or lower. When the reaction pressure falls within the range described above, the reaction can be more conveniently carried out. In the case of using an auxiliary material, the transesterification reaction can be more efficiently accelerated at a pressure increased to some extent in consideration of vapor pressure thereof, etc.

The progression and completion of the transesterification reaction can be confirmed by GPC measurement. As the transesterification reaction progresses, a peak derived from a starting material is decreased in height or area over time. The progression and completion can be confirmed from the disappearance of the peak.

In the method for producing the polycarbonate diol, for example, the step of dehydrating the starting materials used may be performed as pretreatment before the transesterification reaction described above.

In the method for producing the polycarbonate diol, for example, the step of adding the aforementioned catalyst poison for the transesterification reaction catalyst may be performed as aftertreatment after the transesterification reaction described above.

[Coating Material Composition]

The coating material composition of the present embodiment comprises the polycarbonate diol composition mentioned above. The coating material composition of the present embodiment comprising the polycarbonate diol composition mentioned above is excellent in stability during low-temperature storage.

The coating material composition of the present embodiment may comprise a curing agent composition. Examples of the curing agent composition include curing agent compositions containing polyisocyanate.

A production method known in the art is used as a method for producing the coating material composition of the present embodiment. For example, a two-component solvent-based coating material composition in which a coating material base agent composition obtained from the polycarbonate diol composition mentioned above is mixed with a curing agent composition made of polyisocyanate immediately before coating; a one-component solvent-based coating material composition consisting of a urethane polymer having a terminal isocyanate group obtained by reacting the polycarbonate diol composition mentioned above with polyisocyanate; or a one-component solvent-based coating material composition consisting of a polyurethane resin obtained by reacting the polycarbonate diol composition mentioned above, organic polyisocyanate and a chain extender, can be produced.

The coating material composition of the present embodiment can be supplemented with other additives, for example, a curing accelerator (catalyst), a flatting agent, an antisettling agent, a leveling agent, a filler, a dispersant, a flame retardant, a dye, an organic or inorganic pigment, a mold release agent, a rheology modifier, a plasticizer, an antioxidant, an ultraviolet absorber, a light stabilizer, an antifoaming agent, a colorant, and a solvent, according to various purposes. A coating material composition differing in nature, such as a soft-feel coating material and a clear coating material, can be obtained by appropriately containing these other additives.

[Coating Film]

The coating film of the present embodiment is obtained from the coating material composition mentioned above. The coating film of the present embodiment obtained from the coating material composition mentioned above is excellent in adhesion after an endurance test.

A method for producing the coating film of the present embodiment is not particularly limited, and a method known in the art is used.

[Polyurethane]

The polyurethane of the present embodiment is obtained from the polycarbonate diol composition mentioned above. The polyurethane of the present embodiment obtained from the polycarbonate diol composition mentioned above is excellent in adhesion after an endurance test.

The aqueous polyurethane of the present embodiment is obtained from the polycarbonate diol composition mentioned above. The aqueous polyurethane of the present embodiment obtained from the polycarbonate diol composition mentioned above is excellent in adhesion after an endurance test.

Examples of the method for obtaining the polyurethane of the present embodiment include, but are not particularly limited to, a prepolymer method (two-step method) of synthesizing a NCO group-terminated prepolymer using the polycarbonate diol composition mentioned above and an isocyanate compound, and then extending the chain by the addition of a polyhydric alcohol or polyamine, and a one-shot method (one-step method) of polymerizing the polycarbonate diol composition mentioned above, an isocyanate compound and a polyhydric alcohol and/or polyamine at the same time.

Examples of the method for obtaining the aqueous polyurethane of the present embodiment include, but are not particularly limited to, methods described in Examples of Japanese Patent Laid-Open No. 2017-71685.

[Leather]

The artificial leather of the present embodiment is obtained using the polyurethane or the aqueous polyurethane mentioned above. The artificial leather of the present embodiment obtained using the polyurethane or the aqueous polyurethane mentioned above is excellent in adhesion after an endurance test.

The synthetic leather of the present embodiment is obtained using the polyurethane or the aqueous polyurethane mentioned above. The synthetic leather of the present embodiment obtained using the polyurethane or the aqueous polyurethane mentioned above is excellent in adhesion after an endurance test.

[Coating Material]

The coating material of the present embodiment is obtained using the polyurethane or the aqueous polyurethane mentioned above. The coating material of the present embodiment obtained using the polyurethane or the aqueous polyurethane mentioned above is excellent in adhesion after an endurance test.

[Coating Agent]

The coating agent of the present embodiment is obtained using the polyurethane or the aqueous polyurethane mentioned above. The coating agent of the present embodiment obtained using the polyurethane or the aqueous polyurethane mentioned above is excellent in adhesion after an endurance test.

EXAMPLES

Hereinafter, the present embodiment will be described further specifically with reference to specific Examples and Comparative Examples. However, the present embodiment is not limited by these Examples and Comparative Examples by any means without departing from the spirit of the present invention. In the present Examples, the terms "parts" and "%" are based on mass, unless otherwise specified.

Physical properties and evaluation in Examples and Comparative Examples mentioned later were measured and performed by the following methods.

[Hydroxy Value]

The hydroxy value of polycarbonate diol or a polycarbonate diol composition was measured by the following method.

First, a volumetric flask was used, and pyridine was added to 12.5 g of acetic anhydride so as to bring the amount to 50 mL, to prepare an acetylation reagent. Subsequently, in a 100 mL eggplant-shaped flask, 1.0 to 10.0 g of a sample was weighed. Subsequently, to the eggplant-shaped flask, 5 mL of the acetylation reagent and 10 mL of toluene were added with a whole pipette. Then, a condenser was attached to the flask, and the solution in the eggplant-shaped flask was stirred and heated at 100° C. for 1 hour. Subsequently, to the eggplant-shaped flask, 2.5 mL of distilled water was added with a whole pipette, and then, the solution in the eggplant-shaped flask was further heated and stirred for 10 minutes. After cooling of the solution in the eggplant-shaped flask for 2 to 3 minutes, to the eggplant-shaped flask, 12.5 mL of ethanol was added. Subsequently, to the eggplant-shaped flask, 2 to 3 drops of phenolphthalein were added as an indicator, followed by titration with 0.5 mol/L ethanolic potassium hydroxide. Subsequently, in a 100 mL eggplant-shaped flask, 5 mL of the acetylation reagent, 10 mL of toluene and 2.5 mL of distilled water were placed, and the solution in the eggplant-shaped flask was heated and stirred for 10 minutes, followed by titration in the same way as above (blank test). On the basis of the results, the hydroxy value was calculated according to the following expression (i):

$$\text{Hydroxy value(mg-KOH/g)}=\{(F-E)\times 28.05\times f\}/G \quad \text{(i)}$$

In the expression (i), E represents the amount of the sample titrated (mL); F represents the amount titrated (mL) in the blank test; G represents the mass of the sample (g); and f represents the factor of the titration solution.

[GPC Measurement]

The GPC measurement of polycarbonate diol or a polycarbonate diol composition was carried out by the following method.

The concentration of each polycarbonate diol or polycarbonate diol composition was adjusted to 0.5% by mass with tetrahydrofuran (hereinafter, referred to as THF). A number-average molecular weight based on standard polystyrene was measured using a GPC apparatus given below. Then, the proportions of carbonate diol (hereinafter, also simply referred to as "(A)") and a diol component (hereinafter, also simply referred to as "B"), and the area percentage (%) of a number-average molecular weight of 500 or lower were determined from the GPC measurement results.

GPC apparatus: HLC-8320 manufactured by Tosoh Corp.
Column: One column of TSKgel G4000H
One column of G3000H
Two columns of G2000H
Eluent: Tetrahydrofuran (THF)
Flow rate: 1.0 mL/min
Column temperature: 40° C.
RI detector: RI (apparatus: built-in HLC-8320)
Calibration curve: Standard polystyrene (manufactured by Tosoh Corp.)
F-20 (molecular weight: $1.90\times10^5$)
F-10 (molecular weight: $9.64\times10^4$)
F-4 (molecular weight: $3.79\times10^4$)
F-2 (molecular weight: $1.81\times10^4$)
F-1 (molecular weight: $1.02\times10^4$)
A-5000 (molecular weight: $5.97\times10^3$)
A-2500 (molecular weight: $2.63\times10^3$)
A-500
A-1000

The molecular weights of a dimer to a decamer were calculated from A-500 and A-1000.

Dimer (molecular weight: 266)
Trimer (molecular weight: 370)
Tetramer (molecular weight: 474)
Pentamer (molecular weight: 578)
Hexamer (molecular weight: 682)
Heptamer (molecular weight: 786)
Octamer (molecular weight: 890)
Nonamer (molecular weight: 994)
Decamer (molecular weight: 1098)
Calibration curve expression: Cubic polynomial

[Hydrolysis]

The hydrolysis of polycarbonate diol or a polycarbonate diol composition was carried out by the following method.

In a 100 mL eggplant-shaped flask, 1 g of a sample was placed, and 30 g of ethanol and 4 g of potassium hydroxide were further placed, and the mixture was reacted at 100° C. for 1 hour. After cooling to room temperature, to the eggplant-shaped flask, 2 to 3 drops of phenolphthalein were added as an indicator, and the mixture was neutralized with hydrochloric acid. The eggplant-shaped flask was cooled in a refrigerator for 1 hour. Then, precipitated salts were removed by filtration, and the resultant was analyzed by gas chromatography. The concentration of each dihydroxy compound was calculated in terms of % by mass from an area percentage obtained by preparing in advance a calibration curve from each dihydroxy compound known as a standard, and performing gas chromatography (GC). The analysis was conducted using gas chromatography GC-14B (manufactured by Shimadzu Corp.) equipped with DB-WAX (manufactured by J&W Scientific, Inc.) as a column and a flame ionization detector (FID) as a detector. The heating profile of the column was 60° C. kept for 5 minutes which was then raised to 250° C. at 10° C./min.

For example, when 1,6-hexanediol (0.3 mol), 1,5-pentanediol (0.2 mol), 1,4-butanediol (0.1 mol), and 1,3-propanediol (0.05 mol) were obtained as dihydroxy compounds as a result of hydrolyzing the polycarbonate diol composition, the proportion of a dihydroxy compound represented by the formula (B) in the dihydroxy compounds obtained by the hydrolysis of the polycarbonate diol composition is (0.2+0.1+0.05)/(0.3+0.2+0.1+0.05)=53.8% by mol.

[Proportion of Hydroxy Group in Total Quantity of Terminal Group]

The proportion of hydroxy groups in the total quantity of terminal groups in a polycarbonate diol composition was measured in accordance with the method for measuring a primary terminal OH ratio described in Japanese Patent No. 3874664. Specifically, the proportion was measured as follows.

70 g to 100 g of a polycarbonate diol composition was weighed into a 300 cc eggplant-shaped flask, and the polycarbonate diol composition was heated in a heating bath of approximately 180° C. with stirring at a pressure of 0.1 kPa or lower using a rotary evaporator connected to a trap bulb for fraction recovery, to obtain a fraction corresponding to approximately 1 to 2% by mass of the polycarbonate diol composition, i.e., approximately 1 g (0.7 to 2 g) of the fraction, in the trap bulb. This fraction was recovered with approximately 100 g (95 to 105 g) of ethanol (alternatively, a solvent such as tetrahydrofuran, acetone, or methanol may also be used) as a solvent, and the recovered solution was subjected to GC analysis. The proportion of terminal hydroxy groups was calculated from the values of peak areas of the resulting chromatogram according to the following expression.

Ratio of terminal hydroxy groups (% by mol)=(Sum of the peak areas of diols having terminal hydroxy groups)/(Sum of the peak areas of alcohols (excluding ethanol if ethanol was used as a solvent) including diols)×100.

The conditions of GC analysis are as follows.

Conditions of gas chromatography analysis: column; DB-WAX (manufactured by J&W Scientific Inc., US), 30 m, film thickness of 0.25 μm, temperature rise conditions: 60° C. to 250° C., detector: FID (flame ionization detector).

[Low-Temperature Storage of Polycarbonate Diol Composition]

Polycarbonate diol or a polycarbonate diol composition was evaluated for its appearance after storage at 5° C. for 1 week using a small environmental tester (ESPEC SU-241). Determination results were indicated by the following notation.

○: Transparent and liquid

Δ: White turbid or waxy

X: Solidified

[Low-Temperature Storage Quality Evaluation]

A base agent composition was stored at 5° C. for 1 week using a small environmental tester (ESPEC SU-241) and left standing at 23° C. in a 50% RH atmosphere for 1 day. Then, the base agent composition was mixed with a curing agent composition such that the ratio between the number of moles of a hydroxy group (OH group) contained in the base agent composition and the number of moles of an isocyanate group (NCO group) contained in the curing agent (hereinafter, also referred to as the "NCO/OH ratio") was 1.1, to obtain a coating material composition. The obtained coating material composition was painted with a thickness of 40 μm onto an acrylonitrile-butadiene-styrene copolymer (hereinafter, also referred to as "ABS") resin plate. The surface of the coating film after curing was confirmed and evaluated. Determination was indicated by the notation given below. The curing agent composition used was polyisocyanate (manufactured by Asahi Kasei Corp., "TPA-100" (trade name), NCO content: 23.1%).

○: The texture was smooth without grains or whitening of the coating film.

Δ: Very small grains were present, or the texture was slightly rough.

X: Grains were present, and the texture was perceivably rough.

[Endurance Test]

A base agent composition was mixed with TPA-100 such that the NCO/OH ratio was 1.1, to obtain a coating material composition. The obtained coating material composition was painted with a thickness of 40 μm onto three types of resin plates (ABS resin, polycarbonate resin (PC resin), and polymethyl methacrylate (hereinafter, also referred to as "PMMA") resin). Each of the obtained coating films was subjected to an endurance test for 250 hours using DPWL-5R manufactured by Suga Test Instruments Co., Ltd. (black panel temperature: 60° C., irradiance: 30 w/m$^2$, cycle conditions: irradiation at 60° C. for 4 hours and wetting at 40° C. for 4 hours, ultraviolet fluorescent lamp: SUGA-FS-40).

[Adhesion Evaluation]

The coating film after the endurance test was evaluated for its adhesion as follows. In accordance with the cross-cut method of JIS K5600 May 6:1999, a cutter knife was used to make an incision such that 100 grid-like cuts were formed (1 mm×1 mm, each) in the coating film. Then, cellophane tape was attached to the incised coating film surface and peeled off, and the number of remaining grids was measured. From the measured number of grids, adhesion was evaluated on the basis of the following criteria.

(Evaluation Criteria)

○: The number of grids was 90 or more.

Δ: The number of grids was 80 or more and less than 90.

X: The number of grids was less than 80 or impossible to evaluate.

[Compatibility]

Polycarbonate diol or a polycarbonate diol composition was added in 0.2 g portions up to 20 g to 20 g of acrylic polyol ("Setalux 1152" (trade name) manufactured by Allnex Netherlands B.V. (hydroxy value: 138.6 mg-KOH/g resin, solid content: 61% by mass)). The maximum amount of the polycarbonate diol or the polycarbonate diol composition added in which the mixture was homogenous and compatible with each other when mixed at 60° C. was determined. Compatibility percentage was calculated according to the following expression (ii).

Compatibility percentage (%)=(PCD/20)×100 (ii)

In the expression (ii), PCD represents the maximum amount of the polycarbonate diol or the polycarbonate diol composition added.

Synthesis of Polycarbonate Diol and Polycarbonate Diol Composition

Comparative Example 1: Synthesis of Polycarbonate Diol Composition (A-1)

A 3 L glass flask (reactor) equipped with a rectifying column packed with a regular packing material, and a stirring apparatus was charged with 550 g of 2-methyl-1,3-propanediol, 423 g of 1,4-butanediol, and 952 g of ethylene carbonate. Then, 0.195 g of titanium tetra-n-butoxide was placed therein as a catalyst. While a portion of the distillate was extracted, the mixture was reacted at a reaction temperature of 150 to 165° C. for 25 hours. Subsequently, the reactor was connected directly to a condenser. The reaction temperature was raised to 170 to 180° C. Then, the pressure was gradually lowered. While the hydroxy value of the formed polycarbonate diol was measuring by appropriate sampling, the diol component in the reactor was distilled off to obtain polycarbonate diol composition A-1 (576 g) having a hydroxy value of 56.2 mg-KOH/g. The obtained polycarbonate diol composition was evaluated on the basis of the methods described above. The evaluation results are described in Table 1. In the obtained polycarbonate diol composition, 96% by mol of the total quantity of terminal groups was hydroxy groups.

Example 1: Synthesis of Polycarbonate Diol Composition (B-1)

A 3 L glass flask (reactor) equipped with a rectifying column packed with a regular packing material, and a stirring apparatus was charged with 550 g of 2-methyl-1,3-propanediol, 423 g of 1,4-butanediol, and 952 g of ethylene carbonate. Then, 0.197 g of titanium tetra-n-butoxide was placed therein as a catalyst. While a portion of the distillate was extracted, the mixture was reacted at a reaction temperature of 150 to 165° C. for 25 hours. Subsequently, the reactor was connected directly to a condenser. The reaction temperature was raised to 170 to 180° C. Then, the pressure was gradually lowered. While the hydroxy value of the formed polycarbonate diol was measuring by appropriate sampling, the diol component in the reactor was distilled off to obtain polycarbonate diol (570 g) having a hydroxy value of 53.0 mg-KOH/g. The obtained polycarbonate diol (300 g) was transferred to a 0.5 L glass flask (reactor) equipped with a stirring apparatus. 0.39 g of 2-methyl-1,3-propanediol and 0.39 g of 1,4-butanediol were added thereto, and the mixture was stirred at 115° C. for 1 hour to obtain polycarbonate diol composition B-1 (hydroxy value: 56.1 mg-KOH/g). The obtained polycarbonate diol composition was evaluated on the basis of the methods described above. The evaluation results are described in Table 1. In the obtained polycarbonate diol composition, 96% by mol of the total quantity of terminal groups was hydroxy groups.

Comparative Example 2: Synthesis of Polycarbonate Diol (A-2)

A 1 L glass flask (reactor) equipped with a rectifying column packed with a regular packing material, and a stirring apparatus was charged with 330 g of 1,4-butanediol, 130 g of 1,6-hexanediol, and 416 g of ethylene carbonate. Then, 0.095 g of titanium tetra-n-butoxide was placed therein as a catalyst. While a portion of the distillate was extracted, the mixture was reacted at a reaction temperature of 155 to 165° C. for 18 hours. Subsequently, the reactor was connected directly to a condenser. The reaction temperature was raised to 165 to 180° C. Then, the pressure was gradually lowered. While the hydroxy value of the formed polycarbonate diol was measuring by appropriate sampling, the diol component in the reactor was distilled off to obtain polycarbonate diol composition A-2 (325 g) having a hydroxy value of 56.9 mg-KOH/g. The obtained polycarbonate diol composition was evaluated on the basis of the methods described above. The evaluation results are described in Table 1. In the obtained polycarbonate diol composition, 97% by mol of the total quantity of terminal groups was hydroxy groups.

Example 2: Synthesis of Polycarbonate Diol Composition (B-2)

A 1 L glass flask (reactor) equipped with a rectifying column packed with a regular packing material, and a stirring apparatus was charged with 330 g of 1,4-butanediol, 130 g of 1,6-hexanediol, and 416 g of ethylene carbonate. Then, 0.093 g of titanium tetra-n-butoxide was placed therein as a catalyst. While a portion of the distillate was extracted, the mixture was reacted at a reaction temperature of 155 to 165° C. for 18 hours. Subsequently, the reactor was connected directly to a condenser. The reaction temperature was raised to 165 to 180° C. Then, the pressure was gradually lowered. While the hydroxy value of the formed polycarbonate diol was measuring by appropriate sampling, the diol component in the reactor was distilled off to obtain polycarbonate diol (316 g) having a hydroxy value of 51.9 mg-KOH/g. The obtained polycarbonate diol (200 g) was transferred to a 0.5 L glass flask (reactor) equipped with a stirring apparatus. 0.48 g of 1,4-butanediol and 0.30 g of 1,6-hexanediol were added thereto, and the mixture was stirred at 115° C. for 1 hour to obtain polycarbonate diol composition B-2 (hydroxy value: 56.3 mg-KOH/g). The obtained polycarbonate diol composition was evaluated on the basis of the methods described above. The evaluation results are described in Table 1. In the obtained polycarbonate diol composition, 98% by mol of the total quantity of terminal groups was hydroxy groups.

Comparative Example 3: Synthesis of Polycarbonate Diol (A-3)

A 3 L glass flask (reactor) equipped with a rectifying column packed with a regular packing material, and a stirring apparatus was charged with 702 g of 1,4-butanediol, 708 g of 1,6-hexanediol, and 1188 g of ethylene carbonate. Then, 0.276 g of titanium tetra-n-butoxide was placed therein as a catalyst. While a portion of the distillate was extracted, the mixture was reacted at a reaction temperature of 150 to 165° C. for 20 hours. Subsequently, the reactor was connected directly to a condenser. The reaction temperature was raised to 170 to 180° C. Then, the pressure was gradually lowered. While the hydroxy value of the formed polycarbonate diol was measuring by appropriate sampling, the diol component in the reactor was distilled off to obtain polycarbonate diol composition A-3 (1196 g) having a hydroxy value of 51.6 mg-KOH/g. The obtained polycarbonate diol composition was evaluated on the basis of the methods described above. The evaluation results are described in Table 1. In the obtained polycarbonate diol composition, 98% by mol of the total quantity of terminal groups was hydroxy groups.

Example 3: Synthesis of Polycarbonate Diol Composition (B-3)

In a 0.5 L glass flask (reactor) equipped with a stirring apparatus, 0.38 g of 1,4-butanediol and 0.50 g of 1,6-hexanediol were added to the polycarbonate diol A-3 (200 g) obtained in Comparative Example 3, and the mixture was stirred at 115° C. for 1 hour to obtain polycarbonate diol composition B-3 (hydroxy value: 56.3 mg-KOH/g). The obtained polycarbonate diol composition was evaluated on the basis of the methods described above. The evaluation results are described in Table 1. In the obtained polycarbonate diol composition, 98% by mol of the total quantity of terminal groups was hydroxy groups.

Example 4: Synthesis of Polycarbonate Diol Composition (B-4)

In a 0.5 L glass flask (reactor) equipped with a stirring apparatus, 17.5 g of 1,4-butanediol and 23.1 g of 1,6-hexanediol were added to the polycarbonate diol A-3 (200 g) obtained in Comparative Example 3, and the mixture was stirred at 115° C. for 1 hour to obtain polycarbonate diol composition B-4 (hydroxy value: 225.0 mg-KOH/g). The obtained polycarbonate diol composition was evaluated on the basis of the methods described above. The evaluation results are described in Table 1. In the obtained polycarbonate diol composition, 99% by mol of the total quantity of terminal groups was hydroxy groups.

Example 5: Synthesis of Polycarbonate Diol Composition (B-5)

In a 0.5 L glass flask (reactor) equipped with a stirring apparatus, 9.00 g of the polycarbonate diol composition B-4 obtained in Example 4 was added to the polycarbonate diol A-3 (200 g) obtained in Comparative Example 3, and the mixture was stirred at 115° C. for 1 hour to obtain polycarbonate diol composition B-5 (hydroxy value: 59.0 mg-KOH/ g). The obtained polycarbonate diol composition was evaluated on the basis of the methods described above. The evaluation results are described in Table 1. In the obtained polycarbonate diol composition, 98% by mol of the total quantity of terminal groups was hydroxy groups.

Example 6: Synthesis of Polycarbonate Diol Composition (B-6)

In a 0.5 L glass flask (reactor) equipped with a stirring apparatus, 21.00 g of the polycarbonate diol composition B-4 obtained in Example 4 was added to the polycarbonate diol A-3 (200 g) obtained in Comparative Example 3, and the mixture was stirred at 115° C. for 1 hour to obtain polycarbonate diol composition B-6 (hydroxy value: 68.2 mg-KOH/g). The obtained polycarbonate diol composition was evaluated on the basis of the methods described above. The evaluation results are described in Table 1. In the obtained polycarbonate diol composition, 98% by mol of the total quantity of terminal groups was hydroxy groups.

Example 7: Synthesis of Polycarbonate Diol Composition (B-7)

In a 0.3 L glass flask (reactor) equipped with a stirring apparatus, 19.6 g of 1,4-butanediol, 25.6 g of 1,6-hexanediol, and 110.9 g of the polycarbonate diol composition B-4 obtained in Example 4 were added to the polycarbonate diol A-3 (100 g) obtained in Comparative Example 3, and the mixture was stirred at 165° C. for 3 hours to obtain a polycarbonate diol composition (hydroxy value: 289.5 mg-KOH/g).

The obtained polycarbonate diol composition was evaluated on the basis of the methods described above. The evaluation results are described in Table 1. In the obtained polycarbonate diol composition, 98% by mol of the total quantity of terminal groups was hydroxy groups.

Example 8: Synthesis of Polycarbonate Diol Composition (B-8)

In a 0.3 L glass flask (reactor) equipped with a stirring apparatus, 38.6 g of polyether glycol (manufactured by Sanyo Chemical Industries, Ltd., "Newpol PE-61" (trade name), number-average molecular weight: approximately 2000, PEG/PPG=5/30 copolymer) was added to the polycarbonate diol A-3 (90 g) obtained in Comparative Example 3, and the mixture was stirred at 165° C. for 10 hours to obtain a polycarbonate diol composition (hydroxy value: 55.7 mg-KOH/g).

The obtained polycarbonate diol composition was evaluated on the basis of the methods described above. The evaluation results are described in Table 1. In the obtained polycarbonate diol composition, 95% by mol of the total quantity of terminal groups was hydroxy groups.

TABLE 1

| | Example 1 | Example 2 | Example 3 | Example 4 | Example 5 | Example 6 |
|---|---|---|---|---|---|---|
| Polycarbonate diol composition | B-1 | B-2 | B-3 | B-4 | B-5 | B-6 |
| Proportion of diol compound represented by formula (B) or (BB) after hydrolysis | 100 mol % | 68 mol % | 50 mol % | 50 mol % | 50 mol % | 50 mol % |
| Hydroxy value (mgKOH/g) | 56.1 | 56.3 | 56.3 | 225.0 | 59.0 | 68.2 |
| Area percentage of number-average molecular weight of 500 or lower | 1.30% | 1.22% | 1.15% | 11.0% | 1.59% | 2.13% |
| Proportion of (A) based on (A) and (B) in total | 99.27% | 99.62% | 99.72% | 97.43% | 99.62% | 99.49% |
| Proportion of (B) based on (A) and (B) in total | 0.73% | 0.38% | 0.28% | 2.57% | 0.38% | 0.51% |
| Appearance after storage at 5° C. for 1 week | ○ | ○ | ○ | ○ | ○ | ○ |
| Compatibility with acrylic polyol | 15% | 17% | 25% | 100% | 33% | 43% |

| | Example 7 | Example 8 | Comparative Example 1 | Comparative Example 2 | Comparative Example 3 |
|---|---|---|---|---|---|
| Polycarbonate diol composition | B-7 | B-8 | A-1 | A-2 | A-3 |
| Proportion of diol compound represented by formula (B) or (BB) after hydrolysis | 50 mol % | 35 mol % | 100 mol % | 68 mol % | 50 mol % |
| Hydroxy value (mgKOH/g) | 289.5 | 55.7 | 56.2 | 56.9 | 51.6 |
| Area percentage of number-average molecular weight of 500 or lower | 20.00% | 1.09% | 0.90% | 0.88% | 0.85% |
| Proportion of (A) based on (A) and (B) in total | 95.98% | 99.80% | 99.92% | 99.94% | 99.95% |
| Proportion of (B) based on (A) and (B) in total | 4.02% | 0.20% | 0.08% | 0.06% | 0.05% |
| Appearance after storage at 5° C. for 1 week | ○ | ○ | ○ | Δ | ○ |
| Compatibility with acrylic polyol | 100% | 40% | 5% | 7% | 9% |

Preparation of Base Agent Composition

Example 9

100 g of the polycarbonate diol composition B-1 obtained in Example 1 as a base agent, 12.0 g of "ACEMATT TS 100" (trade name) manufactured by Evonik Industries AG as a flatting agent, 0.01 g of dibutyltin dilaurate as a catalyst, 1.2 g of "Disparlon AQ-002" (trade name) manufactured by Kusumoto Chemicals, Ltd. as an antisettling agent, and 218 g of butyl acetate as a solvent were added to a 0.5 L plastic container and stirred until uniform using a stirrer to obtain base agent composition BR-1. The obtained base agent composition was evaluated on the basis of the methods described above. The evaluation results are shown in Table 2.

Examples 10, 11 and 16

Base agent compositions BR-2, BR-3 and BR-8 were obtained by use of the same method as in Example 9 except that polycarbonate diol compositions B-2, B-3 and B-8 were used instead of the polycarbonate diol composition B-1 as a base agent. The obtained base agent composition was evaluated on the basis of the methods described above. The evaluation results are shown in Table 2.

Example 12

65 g of the polycarbonate diol composition B-4 obtained in Example 4 as a base agent, 11.7 g of "ACEMATT TS 100" (trade name) manufactured by Evonik Industries AG as a flatting agent, 0.01 g of dibutyltin dilaurate as a catalyst, 1.2 g of "Disparlon AQ-002" (trade name) manufactured by Kusumoto Chemicals, Ltd. as an antisettling agent, and 212 g of butyl acetate as a solvent were added to a 0.5 L plastic container and stirred until uniform using a stirrer to obtain base agent composition BR-4. The obtained base agent composition was evaluated on the basis of the methods described above. The evaluation results are shown in Table 2.

Example 13

100 g of the polycarbonate diol composition B-5 obtained in Example 5 as a base agent, 12.0 g of "ACEMATT TS 100" (trade name) manufactured by Evonik Industries AG as a flatting agent, 0.01 g of dibutyltin dilaurate as a catalyst, 1.2 g of "Disparlon AQ-002" (trade name) manufactured by Kusumoto Chemicals, Ltd. as an antisettling agent, and 219 g of butyl acetate as a solvent were added to a 0.5 L plastic container and stirred until uniform using a stirrer to obtain base agent composition BR-5. The obtained base agent composition was evaluated on the basis of the methods described above. The evaluation results are shown in Table 2.

Example 14

100 g of the polycarbonate diol composition B-6 obtained in Example 6 as a base agent, 12.4 g of "ACEMATT TS 100" (trade name) manufactured by Evonik Industries AG as a flatting agent, 0.01 g of dibutyltin dilaurate as a catalyst, 1.2 g of "Disparlon AQ-002" (trade name) manufactured by Kusumoto Chemicals, Ltd. as an antisettling agent, and 225 g of butyl acetate as a solvent were added to a 0.5 L plastic container and stirred until uniform using a stirrer to obtain base agent composition BR-6. The obtained base agent composition was evaluated on the basis of the methods described above. The evaluation results are shown in Table 2.

Example 15

100 g of the polycarbonate diol composition B-7 obtained in Example 7 as a base agent, 12.4 g of "ACEMATT TS 100" (trade name) manufactured by Evonik Industries AG as a flatting agent, 0.01 g of dibutyltin dilaurate as a catalyst, 1.2 g of "Disparlon AQ-002" (trade name) manufactured by Kusumoto Chemicals, Ltd. as an antisettling agent, and 215 g of butyl acetate as a solvent were added to a 0.5 L plastic container and stirred until uniform using a stirrer to obtain base agent composition BR-7. The obtained base agent composition was evaluated on the basis of the methods described above. The evaluation results are shown in Table 2.

Comparative Example 4

100 g of the polycarbonate diol composition A-1 obtained in Comparative Example 1 as a base agent, 12.0 g of "ACEMATT TS 100" (trade name) manufactured by Evonik Industries AG as a flatting agent, 0.01 g of dibutyltin dilaurate as a catalyst, 1.2 g of "Disparlon AQ-002" (trade name) manufactured by Kusumoto Chemicals, Ltd. as an antisettling agent, and 218 g of butyl acetate as a solvent were added to a 0.5 L plastic container and stirred until uniform using a stirrer to obtain base agent composition AR-1. The obtained base agent composition was evaluated on the basis of the methods described above. The evaluation results are shown in Table 2.

Comparative Examples 5 and 6

Base agent compositions AR-2 and AR-3 were obtained by use of the same method as in Comparative Example 4 except that polycarbonate diol compositions A-2 and A-3 were used instead of the polycarbonate diol composition A-1 as a base agent. The obtained base agent composition was evaluated on the basis of the methods described above. The evaluation results are shown in Table 2.

TABLE 2

| | Example 9 | Example 10 | Example 11 | Example 12 | Example 13 | Example 14 |
|---|---|---|---|---|---|---|
| Base agent composition | BR-1 | BR-2 | BR-3 | BR-4 | BR-5 | BR-6 |
| Low-temperature storage quality evaluation | ○ | ○ | ○ | ○ | ○ | ○ |

TABLE 2-continued

| | | | | | | | |
|---|---|---|---|---|---|---|---|
| Adhesion | ABS | ○ | ○ | ○ | ○ | ○ | ○ |
| | PC | ○ | ○ | ○ | ○ | ○ | ○ |
| | PMMA | Δ | Δ | Δ | Δ | Δ | Δ |

| | | Example 15 | Example 16 | Comparative Example 4 | Comparative Example 5 | Comparative Example 6 |
|---|---|---|---|---|---|---|
| Base agent composition | | BR-7 | BR-8 | AR-1 | AR-2 | AR-3 |
| Low-temperature storage quality evaluation | | Δ | ○ | Δ | × | Δ |
| Adhesion | ABS | ○ | ○ | Δ | Δ | Δ |
| | PC | ○ | Δ | Δ | Δ | Δ |
| | PMMA | Δ | Δ | × | × | × |

From the results of Tables 1 and 2, it was found that: a polycarbonate diol composition containing a polycarbonate diol represented by the specific formula (A) or (AA) and a diol component represented by the specific formula (B) or (BB) at specific proportions, wherein 90% by mol or more of the total quantity of terminal groups is hydroxy groups, and a hydroxy value is 10 to 400 mg-KOH/g is excellent in compatibility with acrylic polyol and is excellent in stability during low-temperature storage when used as a coating material composition; and a coating film obtained from the coating material composition is excellent in adhesion after an endurance test. It was found that, particularly, when the proportion of the dihydroxy compound represented by the specific formula (B) or (BB) in dihydroxy compounds obtained by the hydrolysis of the polycarbonate diol composition is 50% by mol, the polycarbonate diol composition is much superior in compatibility with acrylic polyol.

The present application is based on Japanese Patent Application No. 2019-206617 filed in Nov. 15, 2019, the contents of which are incorporated herein by reference.

INDUSTRIAL APPLICABILITY

The present invention can be suitably used in a wide range of fields such as coating materials for automobiles, buses, rail vehicles, building site equipment, agricultural machines, floors, walls or roofs of architectures, metal products, mortar or concrete products, wood products, plastic products, and ceramics construction materials such as calcium silicate boards or plaster boards, etc.

The invention claimed is:

1. A polycarbonate diol composition consisting of a polycarbonate diol represented by the following formula (AA) and a diol component represented by the following formula (BB), wherein
   - 90% by mol or more of a total quantity of a terminal group calculated from a proportion of a total hydroxyl group to a total quantity of a terminal hydroxy group is a hydroxy group,
   - a hydroxy value is 10 to 400 mg-KOH/g,
   - a proportion of the polycarbonate diol is 80% by mass or more and 99.90% by mass or less and a proportion of the diol component is 0.10% by mass or more and 20% by mass or less based on 100% by mass in total of the carbonate diol and the diol component, and
   - an area percentage (%) of the polycarbonate diol having a number-average molecular weight of 500 or lower in molecular weight calculation results obtained by calculation by the gel permeation chromatography (GPC) measurement of the polycarbonate diol composition is 1% or more and 20% or less, and
   - a proportion of the diol component represented by the formula (BB) in a dihydroxy compound obtained by the hydrolysis of the polycarbonate diol composition is 5% by mol or more, and 65% by mol or less:

(AA)

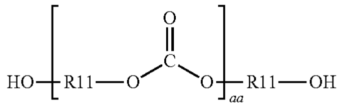

wherein R11 is a $C_2$-$C_7$ divalent linear, a $C_3$-$C_7$ branched or a $C_4$-$C_7$ cyclic aliphatic hydrocarbon group optionally containing a heteroatom, or a $C_6$ divalent aromatic hydrocarbon group optionally containing a heteroatom, and a plurality of R11 moieties are the same as or different from each other; and aa is a number of 1 or larger and 50 or smaller,

HO—R22-OH (BB)

wherein R22 is a divalent linear or branched aliphatic hydrocarbon group having 2 or more and 5 or less carbon atoms and optionally containing a heteroatom.

2. The polycarbonate diol composition according to claim 1, wherein a proportion of the diol component represented by the formula (BB) in a dihydroxy compound obtained by the hydrolysis of the polycarbonate diol composition is 5% by mol or more and 55% by mol or less.

3. The polycarbonate diol composition according to claim 1, wherein appearance of the polycarbonate diol composition stored at 5° C. for 1 week is transparent and liquid.

4. A coating material composition comprising the polycarbonate diol composition according to claim 1.

5. A coating film obtained from the coating material composition according to claim 4.

6. The polycarbonate diol composition according to claim 1, wherein an area percentage (%) of a number-average molecular weight of 500 or lower in molecular weight calculation results obtained by calculation by the gel permeation chromatography (GPC) measurement of the polycarbonate diol composition is 1% or more and 30% or less.

7. The polycarbonate diol composition according to claim 1, wherein a proportion of the diol component represented by the formula (BB) in a dihydroxy compound obtained by the hydrolysis of the polycarbonate diol composition is 5% by mol or more and 100% by mol or less.

8. The polycarbonate diol composition according to claim 1, wherein appearance of the polycarbonate diol composition stored at 5° C. for 1 week is transparent and liquid.

9. A coating material composition comprising the polycarbonate diol composition according to claim 1.

10. A coating film obtained from the coating material composition according to claim 9.

11. The polycarbonate diol composition according to claim 1, wherein R11 is at least one group selected from an ethylene group, a propylene group, a butylene group, a pentylene group, a hexylene group, and a heptylene group.

* * * * *